United States Patent
Zamir et al.

(10) Patent No.: US 11,138,065 B1
(45) Date of Patent: Oct. 5, 2021

(54) STORAGE SYSTEM AND METHOD FOR FAST LOW-DENSITY PARITY CHECK (LDPC) ENCODING

(71) Applicant: Western Digital Technologies, Inc., San Jose, CA (US)

(72) Inventors: Ran Zamir, Ramat Gan (IL); Alexander Bazarsky, Holon (IL); Eran Sharon, Rishon Lezion (IL)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/878,910

(22) Filed: May 20, 2020

(51) Int. Cl.
- *G06F 11/00* (2006.01)
- *G06F 11/10* (2006.01)
- *G06F 3/06* (2006.01)

(52) U.S. Cl.
CPC .......... *G06F 11/1004* (2013.01); *G06F 3/064* (2013.01); *G06F 3/0619* (2013.01); *G06F 3/0658* (2013.01); *G06F 3/0679* (2013.01)

(58) Field of Classification Search
None
See application file for complete search history.

(56) References Cited

U.S. PATENT DOCUMENTS

| | | | | |
|---|---|---|---|---|
| 8,443,257 | B1* | 5/2013 | Zeng | H03M 13/616 714/758 |
| 9,553,608 | B2* | 1/2017 | Li | G06F 11/1068 |
| 10,797,727 | B1* | 10/2020 | Walke | H03M 13/116 |
| 2015/0303942 | A1* | 10/2015 | Zhang | H03M 13/1117 714/763 |
| 2016/0179620 | A1* | 6/2016 | Bazarsky | H03M 13/3707 714/766 |
| 2017/0109233 | A1* | 4/2017 | Ilani | H03M 13/611 |

OTHER PUBLICATIONS

D. -. Lee, W. Luk, C. Wang and C. Jones, "A flexible hardware encoder for low-density parity-check codes," 12th Annual IEEE Symposium on Field-Programmable Custom Computing Machines, 2004, pp. 101-111, doi: 10.1109/FCCM.2004.4. (Year: 2004).*

* cited by examiner

*Primary Examiner* — Daniel F. McMahon
(74) *Attorney, Agent, or Firm* — Crowell & Moring LLP

(57) ABSTRACT

A storage system has a controller with an encoder. The encoder is configured to perform first and second stages of an encoding process in parallel on pipelined data blocks. In this way, while the first stage of the encoding process is being performed on a first data block, the second stage of the encoding process is performed on a second data block.

18 Claims, 9 Drawing Sheets

$x_0, \ldots, x_{k-1}$ — $input$(each Zx1)

$$y \left( \underbrace{x_0, x_1, \ldots, x_{k-1}}_{x}, \underbrace{p_0, p_1, \ldots, p_{m-1}}_{p} \right)^T$$

$H = \begin{bmatrix} H_{info} & H_p \end{bmatrix}$ $Hy = 0 \Rightarrow \boxed{(*)\, H_{info}\, x = H_p\, p}$ $p_0, p_1, \ldots, p_{m-5}$ are easily calculated with forward substitution on (*) due to lower triangular structure of $H_p$ For last 4 rows:

$s\, [s_0, s_1, s_2, s_3]^T | H_{(m-4, m-1) \times (0, k+m-5)} [x_0, x_1, \ldots, x_{k-1}, p_0, p_1, \ldots, p_{m-5}]^T$ $\tilde{p} = [p_{m-4}, p_{m-3}, p_{m-2}, p_{m-1}]^T$ $\Rightarrow s = H_{corner}\, \tilde{p}$ $\boxed{(**)\, \tilde{p} = det_R^{-1}(H_{corner})\, adj_R(H_{corner})\, s}$

FIG. 5

STORAGE SYSTEM AND METHOD FOR FAST LOW-DENSITY PARITY CHECK (LDPC) ENCODING

BACKGROUND

A storage system can use an error correction code (ECC) technique, such as low-density parity check (LDPC) encoding, to detect and correct errors in the data read from memory. In general, during a write operation, an encoder encodes data to generate a codeword that includes parity information associated with the data. During a read operation, the codeword is decoded to detect and correct an error in the data read from the memory.

BRIEF DESCRIPTION OF THE DRAWINGS

FIG. 5 is an illustration of an LDPC parity check matrix of an encoding algorithm of an embodiment.

DETAILED DESCRIPTION

By way of introduction, the below embodiments relate to a storage system and method for fast low-density parity check (LDPC) encoding. In one embodiment, a controller of the storage system has an encoder that is configured to perform first and second stages of an encoding process in parallel on pipelined data blocks. In this way, while the first stage of the encoding process is being performed on a first data block, the second stage of the encoding process is performed on a second data block. Other embodiments are provided.

Figure 1A:
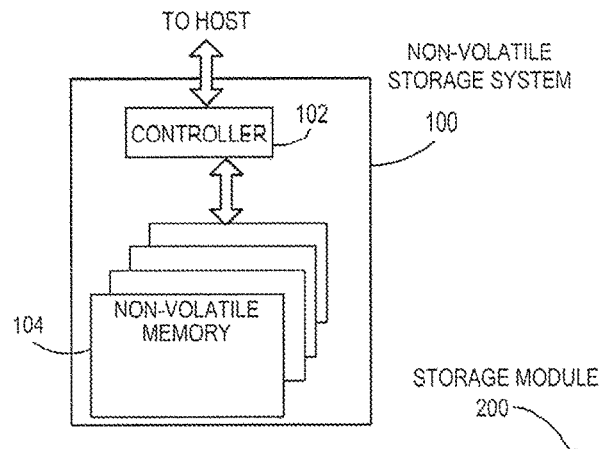
FIG. 1A is a block diagram of a non-volatile storage system of an embodiment.
Figure 1B:
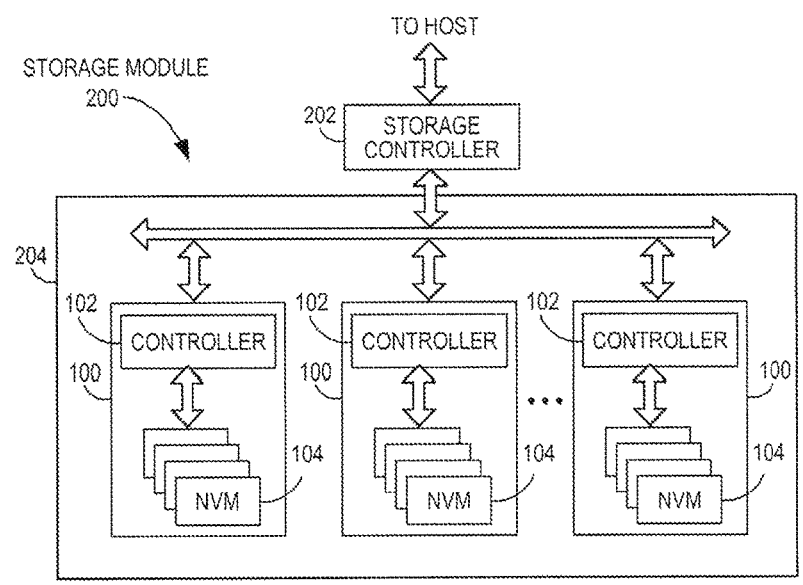
FIG. 1B is a block diagram illustrating a storage module of an embodiment.
Figure 1C:
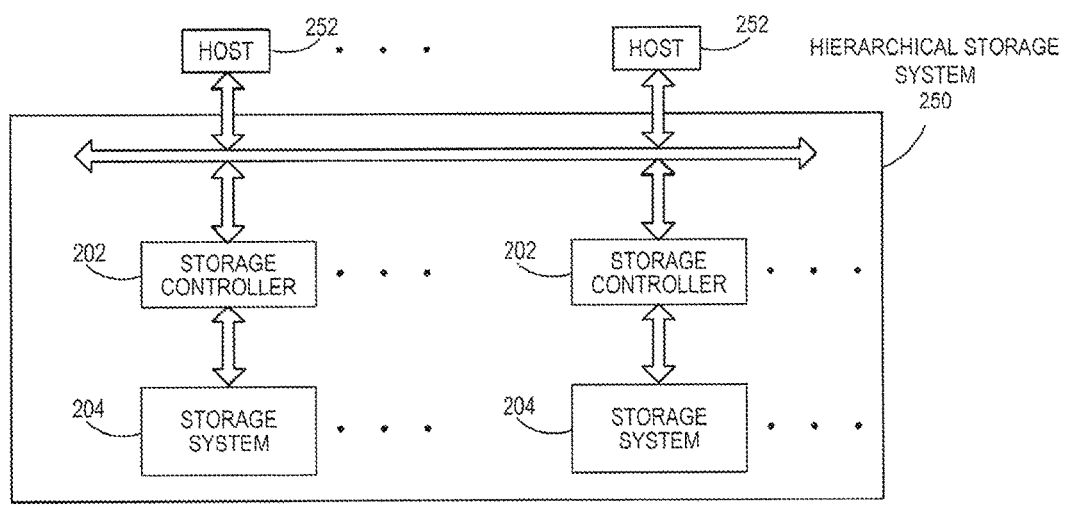
FIG. 1C is a block diagram illustrating a hierarchical storage system of an embodiment.

Turning now to the drawings, storage systems suitable for use in implementing aspects of these embodiments are shown in FIGS. 1A-1C. FIG. 1A is a block diagram illustrating a non-volatile storage system 100 (sometimes referred to herein as a storage device or just device) according to an embodiment of the subject matter described herein. Referring to FIG. 1A, non-volatile storage system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused). Also, the structure for the "means" recited in the claims can include, for example, some or all of the structures of the controller described herein, programmed or manufactured as appropriate to cause the controller to operate to perform the recited functions.

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), quad-level cell (QLC) or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, storage system 100 may be a card based system, such as a secure digital (SD) or a micro secure digital (micro-SD) card. In an alternate embodiment, storage system 100 may be part of an embedded storage system.

Although, in the example illustrated in FIG. 1A, non-volatile storage system 100 (sometimes referred to herein as a storage module) includes a single channel between controller 102 and non-volatile memory die 104, the subject matter described herein is not limited to having a single memory channel. For example, in some storage system architectures (such as the ones shown in FIGS. 1B and 1C), 2, 4, 8 or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile storage systems 100. As such, storage module 200 may include a storage controller 202 that interfaces with a host and with storage system 204, which includes a plurality of non-volatile storage systems 100. The interface between storage controller 202 and non-volatile storage systems 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be a Non-Volatile Memory Express (NVMe) or fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
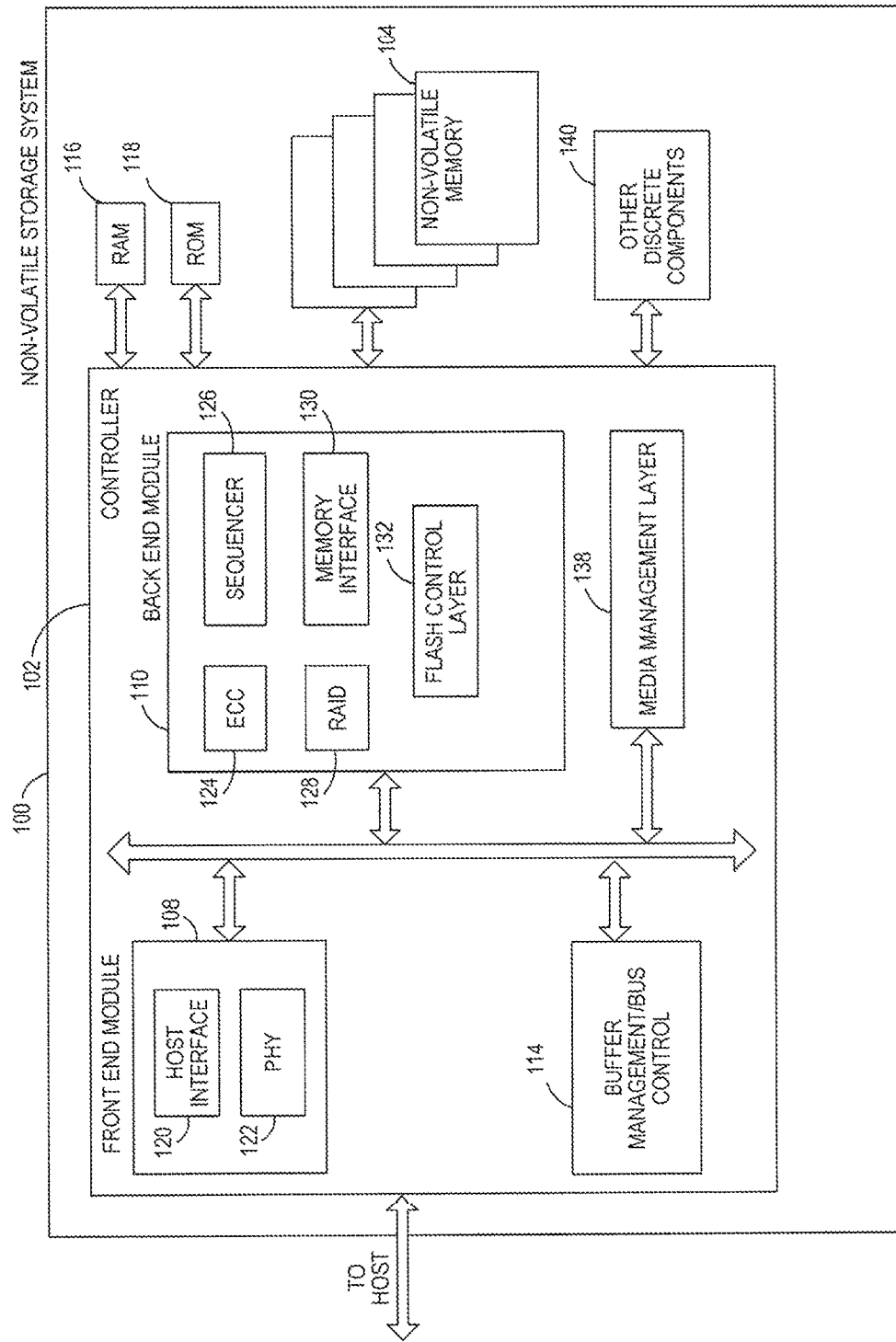
FIG. 2A is a block diagram illustrating components of the controller of the non-volatile storage system illustrated in FIG. 1A according to an embodiment.

FIG. 2A is a block diagram illustrating components of controller 102 in more detail. Controller 102 includes a front end module 108 that interfaces with a host, a back end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. The controller 102 may sometimes be referred to herein as a NAND controller or a flash controller, but it should be understood that the controller 102 can be used with any suitable memory technology, example of some of which are provided below.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

The storage system 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
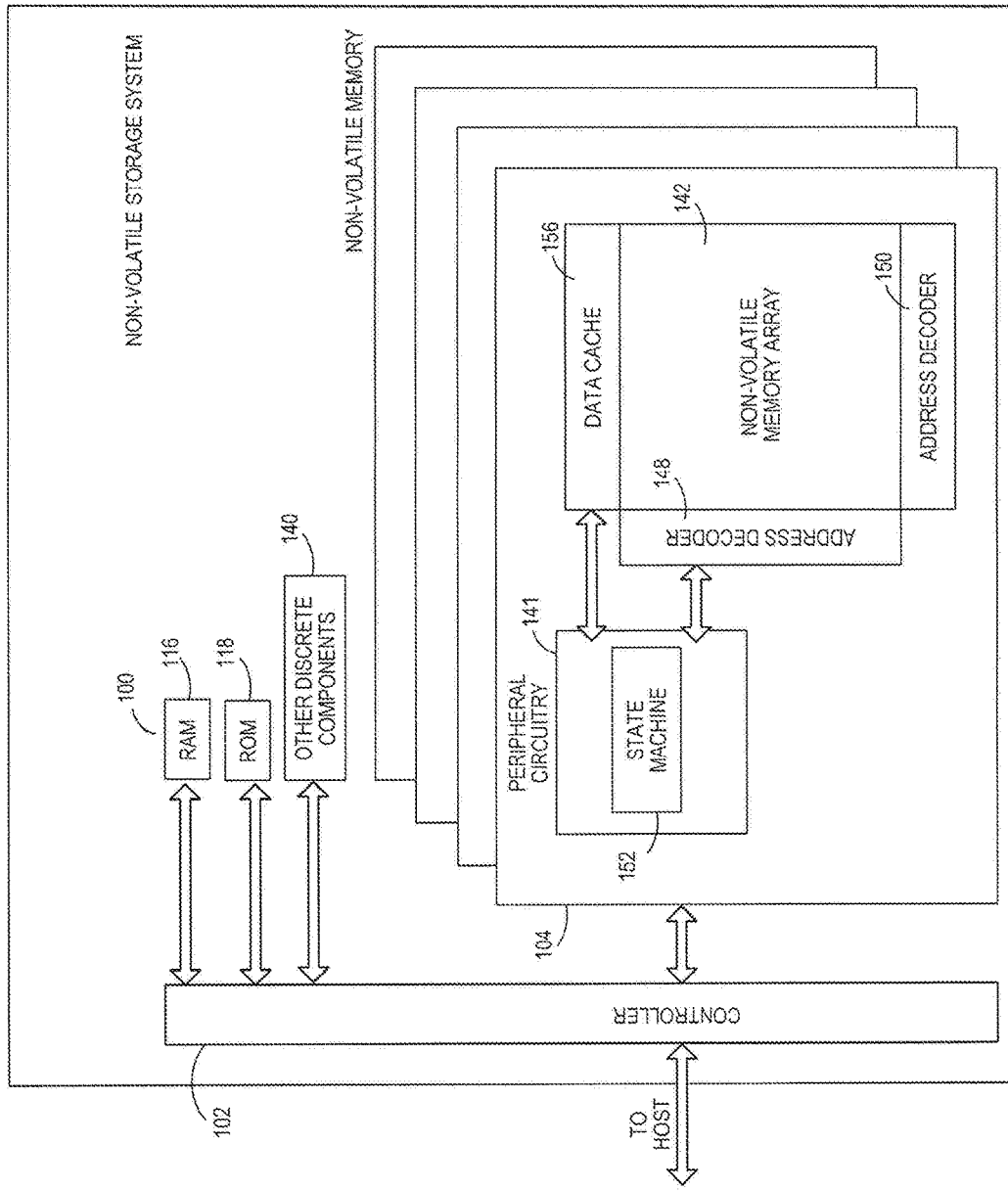
FIG. 2B is a block diagram illustrating components of the non-volatile storage system illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two dimensional and/or three dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may only be written in multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

As described above, the storage system 100 in this embodiment comprises an error correction code (ECC) engine 124. In general, the ECC engine 124, which is a hardware component in one embodiment, implements an encoding technique that can be used to detect and correct errors in the data read from the memory 104. In the following examples, a low-density parity check (LDPC) encoding technique is described, but it should be understood that other techniques can be used. In general, during a write operation, the ECC engine 124 encodes data to generate a codeword that includes parity information associated with the data. During a read operation, the codeword is decoded to detect and correct an error in the data read from the memory 104. That is, the parity bits generated for the data during the encoding process are used during the read operation to determine if bits read from the memory 104 have correct bit values. The parity bits can be used to correct bits that have incorrect bit values.

Figure 3:
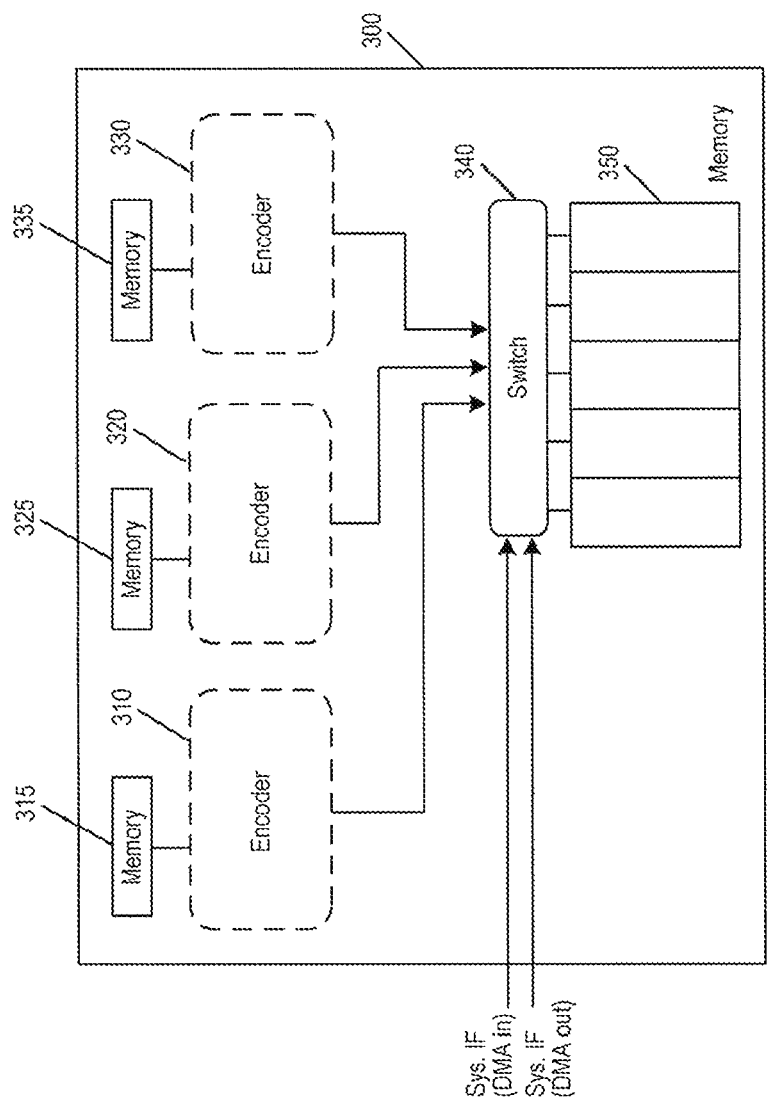
FIG. 3 is a block diagram of a controller of an embodiment having a plurality of encoders.

Turning again to the drawings, FIG. 3 is a block diagram of a controller 300 of an embodiment having a plurality of encoders 310, 320, 330. Each of the encoders 310, 320, 330 has its own memory 315, 325, 335 for using during the encoding process. A switch 340 (i.e., a module allowing each master (encoders) to access each slave (memories)) receives input from the encoders 310, 320, 330, as well as from data from direct memory access (DMA) in and out ports of a system interface, and provides encoded codewords to a memory 350.

As throughput requirements increase from generation to generation, the encoding throughput requirement also increases. However, after many improvements, the common encoder architectures may reach a throughput limit. Also, from an application-specific integrated circuit (ASIC) and firmware perspective, there is a strong incentive to use a single encoder as this simplifies the storage device implementation. Having a plurality of encoders 310, 320, 330 in the controller 102 requires designing a sub-system to abstract those modules or having complex low-level firmware management of those modules. This complicates the management of the exclusive-or (XOR) operations for implementing of independent disks (RAID) algorithms, as flash management units (FMUs) processed in different encoder modules may be needed in the same XOR stripe. To address these issues, the encoder clock frequency can be increased to maintain a single encoder solution. However, increasing the frequency is also limited according to the manufacturing process characteristics.

The following embodiments provide a fast encoder architecture to enable a single encoder solution. As will be discussed in more detail below, this architecture relies on intelligent utilization of the different parts of the encoding process, internally parallelizing and pipelining segments of the encoding process. Next generation storage systems will require higher write throughputs, and the encoder discussed below can be used to meet this requirement. Before turning the specifics of this architecture, an overview of an example encoding process will be presented.

In general, in the encoding process in this example, an error correction code (a data set that determines the parity bits (including the bit values of the parity bits) for a given set of information bits) is generated. For at least some example configurations, an error correction code has a corresponding matrix that represents the error correcting code. For example, an LDPC error correction code has a corresponding LDPC matrix, also referred to as a LDPC parity-check matrix or just parity-check matrix H. In one embodiment, the encoder in the ECC engine 124 generates parity bits for a codeword such that following matrix equation is satisfied: $H\omega=0$, where H is the parity-check matrix and w is the codeword including the information bits and the parity bits.

Figure 4:
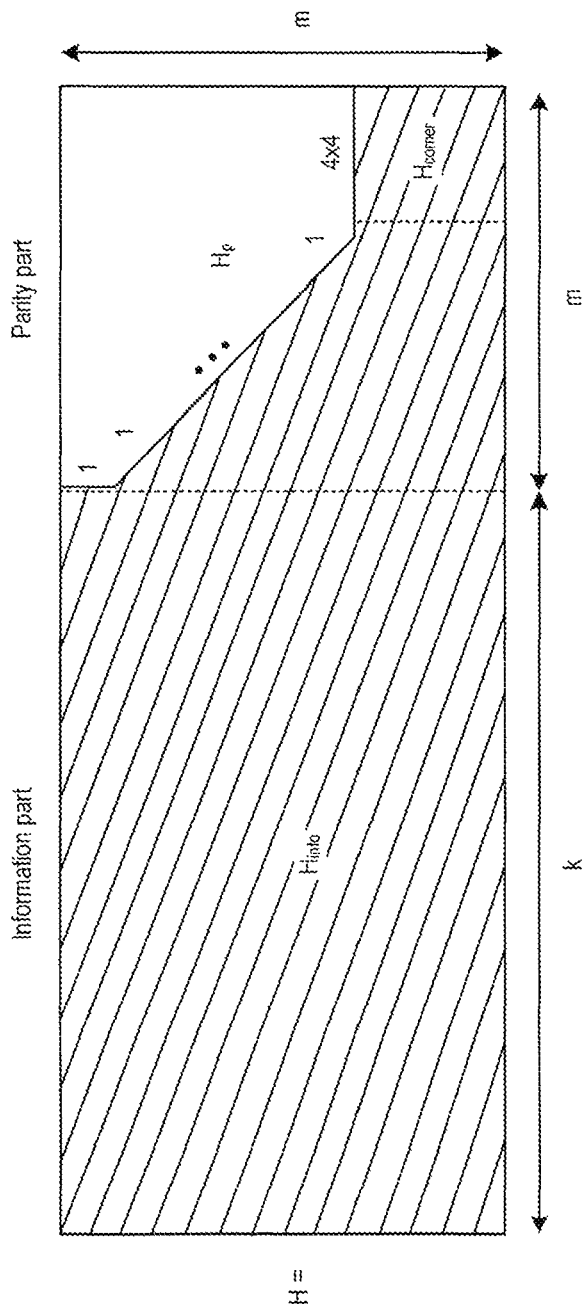
FIG. 4 is an illustration of a low-density parity check (LDPC) matrix structure of an embodiment for encoding data.

FIG. 4 is an illustration of a low-density parity check (LDPC) matrix structure of an embodiment for encoding data. As shown in FIG. 4, the matrix includes an information part and a parity part. The information part includes k-number of columns, and the parity part included m number of columns. The matrix contains m number of rows. Additionally, the information part and the parity part are positioned relative to each other such that the last column of the information part is adjacent to the first column of the parity part. Also, the order of the rows is common amongst the information part and the parity part. In other implementations, the parity bits may be positioned elsewhere, and the parity part columns can be placed accordingly.

FIG. 5 is an illustration of an LDPC parity check matrix of an encoding algorithm of an embodiment. U.S. Patent Application Publication No. US 2017/0109233, which is hereby incorporated by reference, provides more detail on the encoding algorithm. This algorithm can be used to enable fast encoding without matrix inversion.

Figure 6:
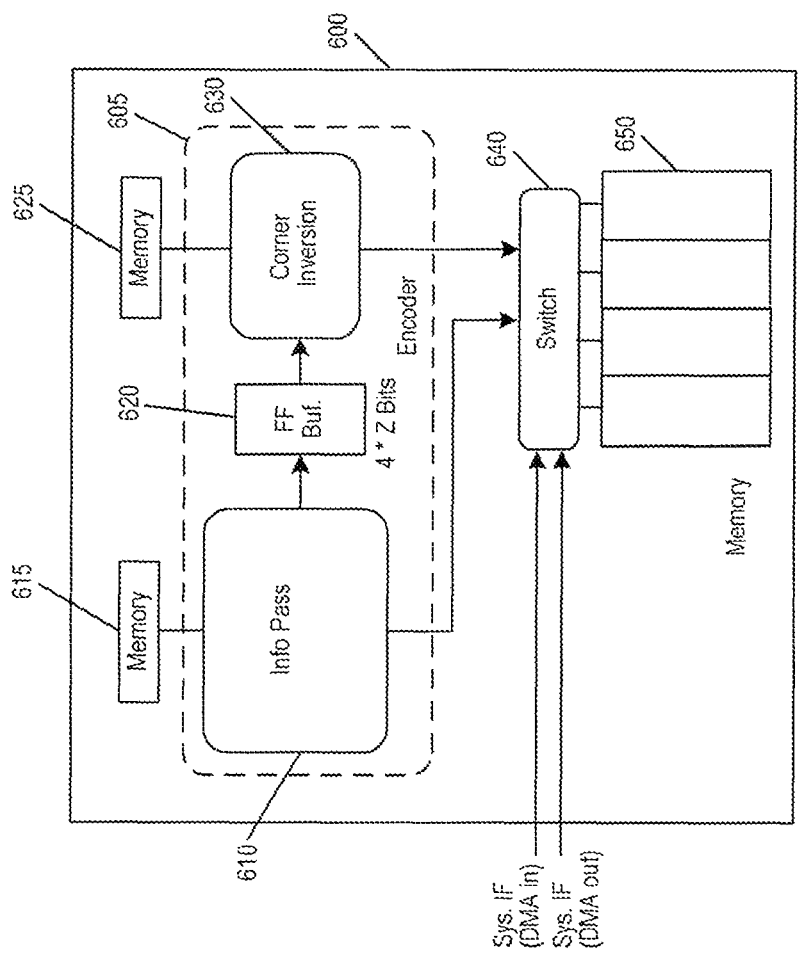
FIG. 6 is a block diagram of a controller of an embodiment having a single encoder.

The following embodiments recognize that an encoding algorithm can be divided into a plurality of stages that can operate on data blocks in a pipelined and parallel manner to allow a single encoder to be used instead of multiple encoders. This would overcome the problems mentioned above. For example, the above-mentioned encoding algorithm can be divided into two stages (the information pass stage and the corner inversion stage), which then can be implemented in two different hardware modules 610, 630 in a single encoder 605 in the controller 600 (see FIG. 6). One hardware module 610 is for the information pass stage, and the other hardware module 620 is for the corner inversion stage. Each of the hardware modules 610, 630 has its own memory 615, 625, and a flip-flop buffer (or RAM) 620 links the two modules 610, 630 and stores the interim calculations needed for the corner inversion stage. The two modules 610, 630 provide input to the switch 640, which stores codewords in memory 650.

Figure 7:
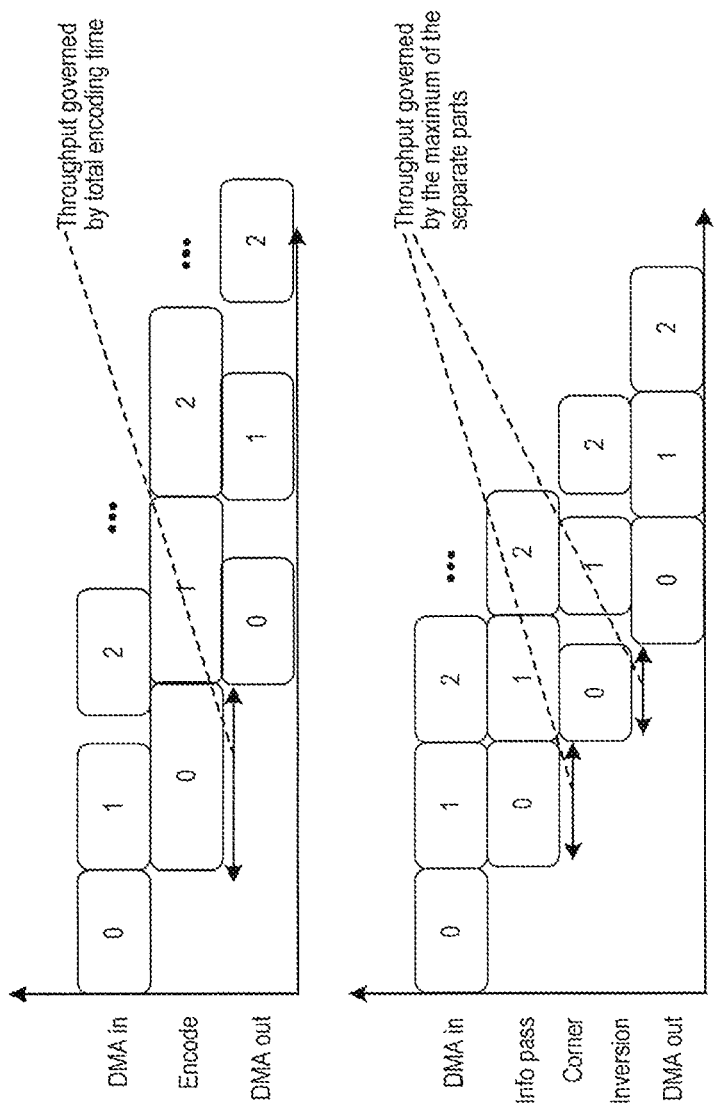
FIG. 7 shows graphs that illustrate an advantage of a parallel, pipelined encoding process of an embodiment.

Having the encoding stages divided into different modules allows for a single, very-fast LDPC encoder because the various stages can be pipelined, so that encoding calculations of each stage can be performed on different data blocks in a pipeline at the same time. This is illustrated in FIG. 7. The top graph in FIG. 7 illustrates an encoding process where all the encoding stages are performed by a single module. As shown in that graph, even though data blocks 0, 1, and 2 have been received, the encoding of data blocks 1 and 2 are delayed until after the encoding of data block 0 is complete. Therefore, the throughput of the encoder is governed by the total encoding time of a data block. That is, since the throughput is governed by the total encoding time, the next data block "waits in line" for the current data block to finish.

In contrast, as shown in the bottom graph of FIG. 7, because the parts of the encoding process are broken down into the information pass stage and the corner inversion stage in this embodiment, processing of these two stages can be conducted in parallel by the two different hardware modules. Thus, one data block can undergo the information pass while another data block is undergoing corner inversion. This greatly reduces the latency hiccup induced by waiting for the entire data block to finish before encoding the next data block.

Figure 8:
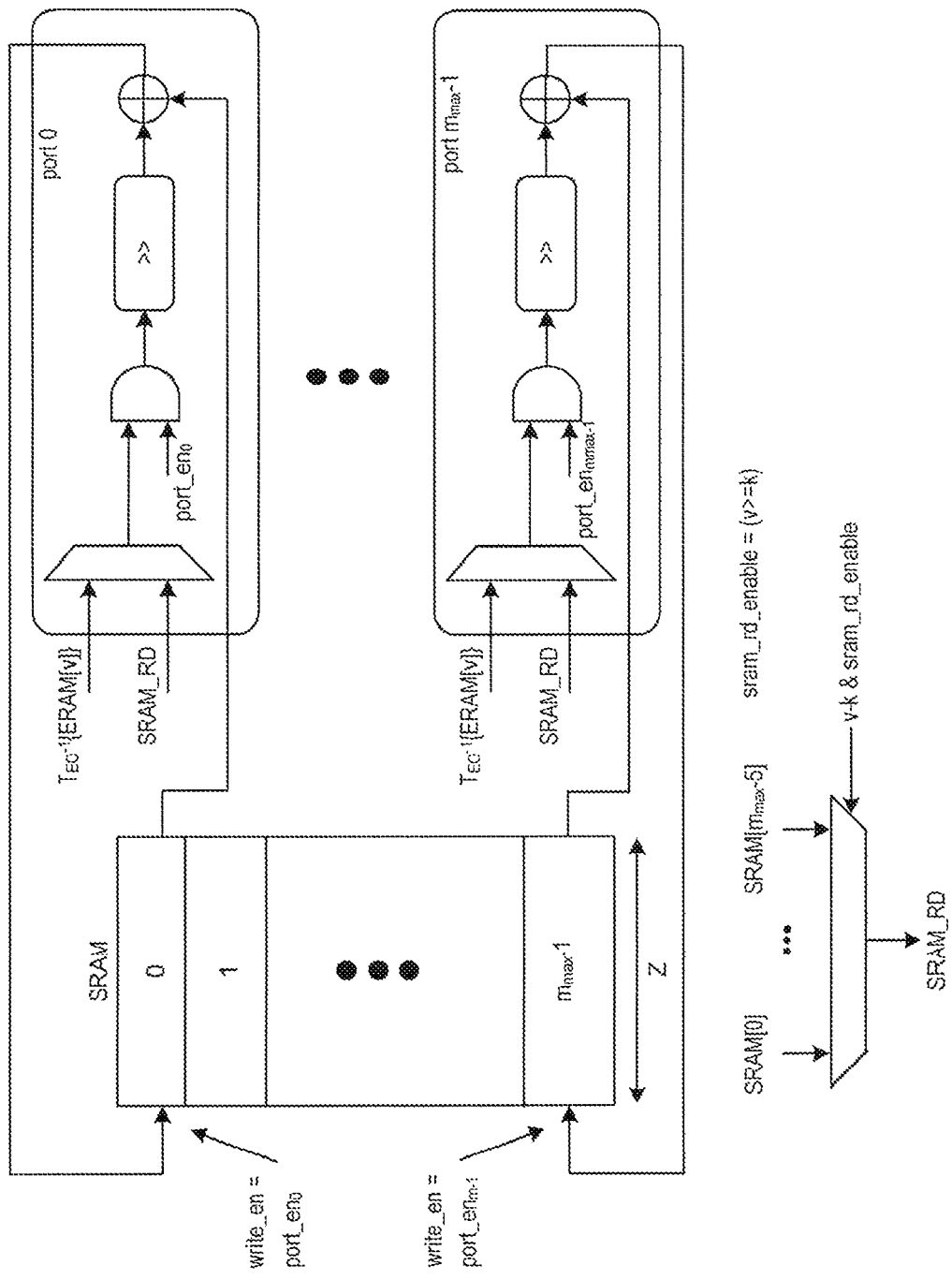
FIG. 8 is a block diagram illustrating a parallel architecture of an embodiment.

In this embodiment, the throughput is governed by the slowest stage (i.e., the maximum time of the separate stages). For example, the information pass stage is typically much slower than the corner inversion stage because it requires more calculations. In another embodiment, to attempt to balance the two stages, a super-parallel architecture for the information pass stage, can be used that processes up to one full column of H every clock cycle. This architecture, which is similar to a bit-flipping decoder, is shown in FIG. 8. As shown in FIG. 8, a full column (up to Dv Z-tuples) are processed every clock cycle, where Dv is the column weight and Z is the code-lifting factor. Data is read from the parity RAM (PRAM) (e.g., a flip-flop array), XORed with the information bits Z-tuple read from the encoder memory and written back to the SRAM.

There are several advantages associated with these embodiments. For example, using several encoders is much less efficient that using a single encoder, as each encoder module requires its own set of memories. Since using a single encoder module requires only one set of memories, this would reduce the cost of the controller. Also, as compared to a single encoder with a very-high clock frequency, these embodiments allow for much lower clock frequencies, which results in power reduction. Further, these embodiments require less hardware effort, as building a controller with several encoders requires a substantial ASIC development effort. These embodiments also require less firmware effort since using a single fast encoder simplifies the firmware, especially the XOR (RAID) management. Performance is also improved with these embodiments.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A storage system comprising:
   a memory; and
   a controller configured to communicate with the memory, wherein the controller comprises an encoder configured to perform first and second stages of an encoding process in parallel on pipelined data blocks, wherein the first stage comprises an information pass stage, and wherein the second stage comprises a corner inversion stage, and wherein while the first stage of the encoding process is being performed on a first data block, the second stage of the encoding process is performed on a second data block.

2. The storage system of claim 1, wherein the encoder comprises a low-density parity check (LDPC) encoder.

3. The storage system of claim 1, wherein the first and second stages are processed by two different hardware components in the controller.

4. The storage system of claim 3, wherein the two different hardware components comprise an information pass module and a corner inversion module.

5. The storage system of claim 1, wherein the first stage is slower than the second stage.

6. The storage system of claim 1, wherein the encoder is the only encoder in the controller.

7. The storage system of claim 1, wherein the memory comprises a three-dimensional memory.

8. In an encoder of a storage system comprising a memory, a method comprising:
   receiving a pipeline of data blocks; and
   performing first and second encoding calculations in parallel on the pipelined data blocks, wherein while the first encoding calculation is being performed on a first data block, the second encoding calculation is performed on a second data block, wherein the first encoding calculation is for an information pass stage, and wherein the second encoding calculation is for a corner inversion stage.

9. The method of claim 8, wherein the encoder comprises a low-density parity check (LDPC) encoder.

10. The method of claim 8, wherein the first and second encoding calculations are processed by two different hardware components in the encoder.

11. The method of claim 10, wherein the two different hardware components comprise an information pass module and a corner inversion module.

12. The method of claim 8, wherein the first encoding calculation is slower than the second encoding calculation.

13. The method of claim 8, wherein the encoder is the only encoder in the storage system.

14. The method of claim 8, wherein the memory comprises a three-dimensional memory.

15. A storage system comprising:
    a memory; and
    means for performing first and second stages of an encoding process in parallel on pipelined data blocks, wherein while the first stage of the encoding process is being performed on a first data block, the second stage of the encoding process is performed on a second data block.

16. The storage system of claim 15, wherein the means for performing is part of a low-density parity check (LDPC) encoder.

17. The storage system of claim 15, wherein the first stage comprises an information pass stage, and wherein the second stage comprises a corner inversion stage.

18. The storage system of claim 15, wherein the first stage is slower than the second stage.

* * * * *